US012713505B2

(12) United States Patent
Zuin et al.

(10) Patent No.: US 12,713,505 B2
(45) Date of Patent: Aug. 18, 2026

(54) ADAPTIVE UNIVERSAL LED BYPASS

(71) Applicant: Infineon Technologies AG, Neubiberg (DE)

(72) Inventors: Riccardo Zuin, Saonara (IT); Anastasia Ioannidou, Padua (IT)

(73) Assignee: Infineon Technologies AG, Neubiberg (DE)

( * ) Notice: Subject to any disclaimer, the term of this patent is extended or adjusted under 35 U.S.C. 154(b) by 106 days.

(21) Appl. No.: 18/777,228

(22) Filed: Jul. 18, 2024

(65) Prior Publication Data

US 2025/0056691 A1 Feb. 13, 2025

(30) Foreign Application Priority Data

Aug. 11, 2023 (DE) ......................... 102023121538.8

(51) Int. Cl.
*H05B 45/345* (2020.01)
*H05B 45/34* (2020.01)
*H05B 47/155* (2020.01)

(52) U.S. Cl.
CPC ........... *H05B 45/345* (2020.01); *H05B 45/34* (2020.01); *H05B 47/155* (2020.01)

(58) Field of Classification Search
None
See application file for complete search history.

(56) References Cited

U.S. PATENT DOCUMENTS 8,400,081 B2 3/2013 Catalano et al.
8,963,431 B2 2/2015 van den Berg et al.
9,468,051 B1 10/2016 Lin et al.
9,781,788 B1 10/2017 Cortigiani et al.
(Continued)

FOREIGN PATENT DOCUMENTS

WO 2012063141 A1 5/2012

OTHER PUBLICATIONS

"Infineon® LITIX™ Basic Driver Family, Multichannel Solutions for N-1, Open Load & Short Circuit Detection," Infineon, Application Note, Automotive Power, V1.1, Mar. 27, 2015, 65 pp.

*Primary Examiner* — Kenneth B Wells
(74) *Attorney, Agent, or Firm* — Shumaker & Sieffert, P.A.

(57) ABSTRACT

An electronic circuit is presented. The electronic circuit is configured for being connected to at least one LED (light emitting diode) and at least one driver circuit. The driver circuit is configured for providing a driver current $I_D$. The electronic circuit comprises:

a bypass circuit configured for bypassing at least a portion of $I_D$ around the LED; and a detection circuit defining a threshold voltage $V_{th}$, wherein the detection circuit is configured for activating the bypass circuit when an output voltage $V_{out}$ at the driver circuit drops below $V_{th}$, wherein $V_{th}$ matches a minimum output voltage $V_{out,min}$ of the driver circuit.

Further, a driver system, a lighting system and a method for bypassing at least one LED are presented.

15 Claims, 7 Drawing Sheets

(56) References Cited

U.S. PATENT DOCUMENTS

| | | | |
|---|---|---|---|
| 9,835,668 | B2 | 12/2017 | Kriebernegg |
| 10,136,496 | B2 | 11/2018 | Sudhaus |
| 10,187,955 | B2 | 1/2019 | Pamato et al. |
| 10,542,593 | B1 | 1/2020 | Mignoli et al. |
| 11,523,484 | B2 | 12/2022 | Mignoli et al. |
| 11,849,514 | B1 | 12/2023 | Montoncelli et al. |
| 2007/0188425 | A1 | 8/2007 | Saccomanno |
| 2007/0257645 | A1 | 11/2007 | Nishino |
| 2010/0207543 | A1 | 8/2010 | Crawford et al. |
| 2010/0315019 | A1 | 12/2010 | Hoogzaad et al. |
| 2011/0199003 | A1 | 8/2011 | Muguruma et al. |
| 2011/0273102 | A1* | 11/2011 | van de Ven ............ H05B 45/48 315/193 |
| 2012/0181931 | A1 | 7/2012 | Katsura |
| 2013/0082602 | A1 | 4/2013 | Bradford |
| 2013/0088174 | A1 | 4/2013 | Yagi et al. |
| 2013/0127353 | A1 | 5/2013 | Athalye et al. |
| 2013/0257279 | A1 | 10/2013 | Le |
| 2014/0139112 | A1 | 5/2014 | Shteynberg et al. |
| 2014/0184080 | A1* | 7/2014 | Rybicki ................ H01L 25/167 315/122 |
| 2014/0241387 | A1 | 8/2014 | Ortiz |
| 2015/0022112 | A1 | 1/2015 | Nietfeld |
| 2015/0108909 | A1 | 4/2015 | Rupp |
| 2015/0245433 | A1 | 8/2015 | McCune, Jr. |
| 2016/0044757 | A1 | 2/2016 | Koo |
| 2016/0205742 | A1 | 7/2016 | Seki et al. |
| 2016/0219670 | A1 | 7/2016 | Sudhaus |
| 2017/0367155 | A1 | 12/2017 | Cortigiani et al. |
| 2018/0054870 | A1 | 2/2018 | Yanagizu |
| 2018/0332680 | A1* | 11/2018 | Ichikawa .............. F21S 41/336 |
| 2018/0352622 | A1 | 12/2018 | Ng |
| 2019/0268983 | A1* | 8/2019 | Song ....................... H02M 1/12 |
| 2019/0364625 | A1 | 11/2019 | Brower |

* cited by examiner

ADAPTIVE UNIVERSAL LED BYPASS

This application claims priority to German Application Number 102023121538.8, filed on Aug. 11, 2023, the entire content of which is incorporated herein by reference.

TECHNICAL FIELD

The present disclosure relates to an electronic circuit and a method for bypassing at least one LED (short for light emitting diode).

BACKGROUND

LEDs are used in various applications such as for displaying information or for illuminating objects or areas. One specific example would be a headlight, e.g. a rear light, in an automotive application. A plurality of LEDs can for instance be connected in series as an LED chain and, further on, multiple LED chains can be arranged in parallel as a LED matrix. However, generally, other applications and arrangements for LEDs are also feasible.

In principle, an LED is a semiconductor device that emits light when electric current goes through it. Thus, the LED is typically powered by a driver circuit providing such electric current. Further on, a supply voltage is required. Specifically for automotive applications, the supply voltage is typically provided by a battery. However, generally, other options are again feasible.

As an example, in automotive applications, the battery voltage may typically be 12.5 V, but it can go down to 6 V in the normal functional range. For this reason, when designing a driver system for a rear light, it is typically not possible to use more than two red LEDs with forward voltage of 2.4 V connected in series while guaranteeing that the LED chain is always on without flickering. In such case, it may be an option to use an external circuit for monitoring the battery voltage and to bypass one or more LEDs in the LED chain when the battery voltage decreases below a predetermined threshold voltage. However, this can lead to an inaccurate bypassing of the LEDs, specifically in the case of longer LED chains. An LED is a load which typically strongly changes its forward voltage depending on temperature, driver current, aging effects and/or binning. Binning generally refers to a forward voltage variation of LEDs due to manufacturing differences. A voltage drop over a LED may for instance vary by 0.15 V due to binning. A variation due to temperature may for instance be in a similar range. Thus, a total variation, neglecting aging effects, may for instance be approximately 1.5 V or even more. As a result, it may be difficult to predetermine a suitable threshold voltage for the battery voltage for bypassing the LEDs. This variation must be taken into account, which may limit the application of the system.

Rohm Co., Ltd. provides two corresponding systems with BD18326NUF-M and BD18336NUF-M.

SUMMARY

In a first aspect of the present disclosure an electronic circuit is presented. The electronic circuit is configured for being connected to at least one LED (light emitting diode) and at least one driver circuit. The driver circuit is configured for providing a driver current $I_D$. The electronic circuit comprises a bypass circuit configured for bypassing at least a portion of $I_D$ around the LED. The electronic circuit further comprises a detection circuit. The detection circuit defines a threshold voltage $V_{th}$. The detection circuit is configured for activating the bypass circuit when an output voltage $V_{out}$ of the driver circuit drops below $V_{th}$. $V_{th}$ matches a minimum output voltage $V_{out,min}$ of the driver circuit.

In a further aspect of the present disclosure a driver system is presented. The driver system comprises at least one electronic circuit according to any one of the embodiments referring to an electronic circuit disclosed above or below in further detail. The driver system further comprises at least one driver circuit configured for providing a driver current $I_D$.

In a further aspect of the present disclosure a lighting system is presented. The lighting system comprises at least one driver system according to any one of the embodiments referring to a driver system disclosed above or below in further detail. The lighting system further comprises at least one LED.

In a further aspect of the present disclosure a method for bypassing at least one LED is presented. The method is performed by using at least one electronic circuit according to any one of the embodiments referring to an electronic circuit disclosed above or below in further detail. The method comprises at least the following steps:

a) activating the bypass circuit by using the detection circuit when an output voltage $V_{out}$ of a driver circuit drops below $V_{th}$ of the detection circuit; and
b) bypassing at least a portion of $I_D$ around the LED by using the bypass circuit.

Those skilled in the art will recognize additional features and advantages upon reading the following detailed description, and upon viewing the accompanying drawings.

BRIEF DESCRIPTION OF THE DRAWINGS

The present disclosure is illustrated by way of example, and not by way of limitation, in the figures of the accompanying drawings in which like reference numerals refer to similar or identical elements. The elements of the drawings are not necessarily to scale relative to each other. The features of the various illustrated examples can be combined unless they exclude each other.

DETAILED DESCRIPTION

Figure 1:
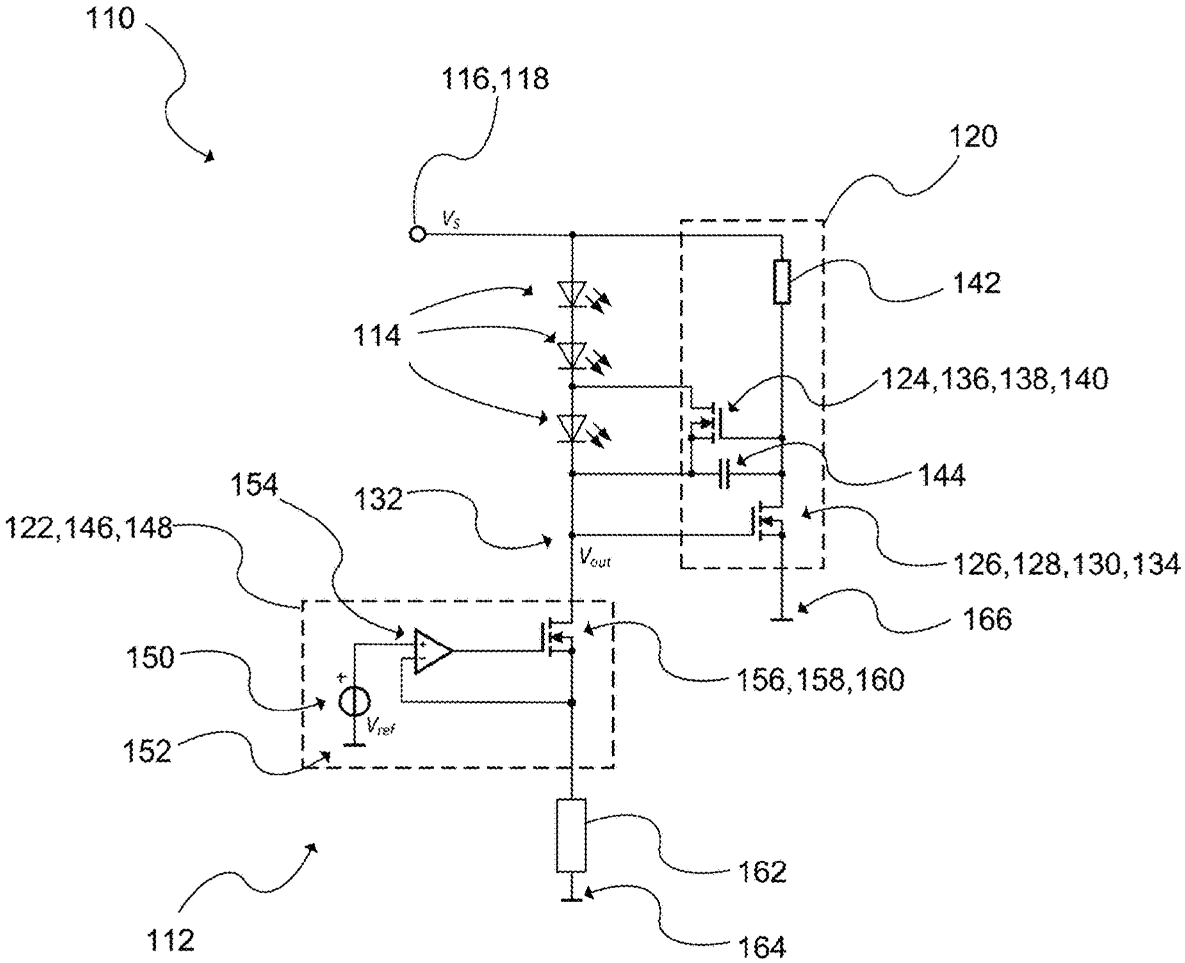
FIG. 1 illustrates a circuit diagram of an exemplary lighting system.

In a first aspect of the present disclosure an electronic circuit is presented. The term "electronic circuit" as generally used herein is a broad term and is to be given its ordinary and customary meaning to a person of ordinary skill in the art and is not to be limited to a special or customized meaning. Without limitation, the electronic circuit may specifically be or may comprise at least one electronic component, which may be connected to at least one further electronic component, e.g. a further electronic component within the electronic circuit or an electronic component of a further electronic circuit. The electronic circuit may be an assembly of at least two electronic components, which are at least partially interconnected through conductive elements. As an example, the electronic components may comprise resistors, inductors, capacitors, diodes and/or transistors. As an example, the conductive elements may comprise wires and/or traces. The electronic circuit may be or may comprise at least one integrated circuit. Thus, the electronic circuit or at least a part of the electronic circuit may be arranged on at least one piece of semiconductor material, specifically silicon.

The electronic circuit may be divided into a plurality of electronic subcircuits, such as a bypass circuit and/or a detection circuit and/or others, as will be outlined in further detail below. In other words, the electronic circuit may comprise a plurality of electronic subcircuits. An electronic subcircuit may itself be an electronic circuit, specifically an electronic circuit as defined above. Thus, the electronic subcircuit may specifically be at least one electronic component, which may be connected to at least one further electronic component, such as a further electronic component of a further electronic subcircuit within the superordinate electronic circuit. An electronic subcircuit may be configured for performing at least one task or function, specifically within the superordinate electronic circuit. One or more electronic subcircuits may at least partially work together or act jointly for performing the task or the function. One or more electronic subcircuits may at least partially share electronic components and/or conductive elements. As indicated, one or more electronic subcircuits may be electronically connected with each other.

The electronic circuit is configured for being connected to at least one LED. The term "LED", which is short for "light emitting diode", as generally used herein is a broad term and is to be given its ordinary and customary meaning to a person of ordinary skill in the art and is not to be limited to a special or customized meaning. Without limitation, the LED may be a semiconductor device configured for emitting light when electric current goes through it. Specifically, the LED may be configured for use in an automotive application, e.g. as a rear light or as a front light of a vehicle or at least as a part thereof. A plurality of LEDs may be connected in series for forming an LED chain. A plurality of LED chains may be arranged in parallel for forming an LED matrix.

The electronic circuit is further configured for being connected to at least one driver circuit. The driver circuit is configured for providing a driver current $I_D$. The term "driver circuit" as generally used herein is a broad term and is to be given its ordinary and customary meaning to a person of ordinary skill in the art and is not to be limited to a special or customized meaning. Without limitation, the driver circuit may be an electronic circuit configured for supplying a suitable electric current, i.e. the driver current $I_D$, to a device, specifically to at least one LED. The driver circuit may be configured for regulating the driver current, specifically with respect to the requirements of the devices such as the at least one LED. The driver circuit may comprise at least one of a current sink, specifically a constant current sink, and a current source, specifically a constant current source. The driver circuit may be or may comprise at least one integrated circuit.

The electronic circuit comprises a bypass circuit configured for bypassing at least a portion of $I_D$ around the LED. The term "bypass circuit" as generally used herein is a broad term and is to be given its ordinary and customary meaning to a person of ordinary skill in the art and is not to be limited to a special or customized meaning. Without limitation, the bypass circuit may be an electronic circuit or more specifically an electronic subcircuit configured for providing a bypass, specifically within a superordinate electronic circuit. In other words, the bypass circuit may be an electronic subcircuit configured for providing a bypass within an electronic circuit. The bypass circuit may be configured for bypassing at least one component within the electronic circuit, specifically at least one LED. The bypass circuit may be configured for leading an electric current, specifically the driver current $I_D$ or at least a portion of the $I_D$, around at least one device or around at least one section of an electronic circuit, specifically around at least one LED. The bypass circuit may be configured for bypassing all of $I_D$. The bypass circuit may be configured for bypassing only a portion of $I_D$ and thus specifically not all of $I_D$.

The electronic circuit further comprises a detection circuit. The term "detection circuit" as generally used herein is a broad term and is to be given its ordinary and customary meaning to a person of ordinary skill in the art and is not to be limited to a special or customized meaning. Without limitation, the detection circuit may be an electronic circuit or more specifically an electronic subcircuit configured for detecting or identifying at least one physical entity or state. The detection circuit may further be configured for triggering at least one event, specifically an activation of at least one further electrical component, upon detection of the physical entity or state.

The detection circuit defines a threshold voltage $V_{th}$. The term "threshold voltage", also denoted by "$V_{th}$", as generally used herein is a broad term and is to be given its ordinary and customary meaning to a person of ordinary skill in the art and is not to be limited to a special or customized meaning. Without limitation, $V_{th}$ may be a voltage triggering at least one event, specifically an activation of at least one further electrical component. In other words, the event may be triggered when $V_{th}$ is reached. Specifically, as will also be outlined further below, $V_{th}$ may be the threshold voltage of a transistor, specifically a FET (short for field effect transistor). Thus, $V_{th}$ may be a minimum gate-to-source voltage required for generating a conducting path between a source electrode and a drain electrode of the FET. The conducting path may generally lead to an increase in electric current running through the FET. As a result, the increased electric current may trigger an event.

The detection circuit is configured for activating the bypass circuit when an output voltage $V_{out}$ of the driver circuit drops below $V_{th}$. $V_{th}$ matches a minimum output voltage $V_{out,min}$ of the driver circuit. The terms "output voltage" and "minimum output voltage" as generally used herein are broad terms and are to be given their ordinary and customary meaning to a person of ordinary skill in the art and are not to be limited to a special or customized meaning. Without limitation, the output voltage may be a voltage at an output of a device or an electronic circuit, specifically of the driver circuit. The minimum output voltage may be a minimum voltage required by a device or an electronic circuit, specifically by the driver circuit, for operation, specifically for normal operation or for faultless operation. Thus, the minimum output voltage may be the minimum voltage required by the driver circuit for providing the driver current $I_D$ sufficiently, specifically to the at least one LED.

The term "activating", including grammatical variations thereof, as generally used herein is a broad term and is to be given its ordinary and customary meaning to a person of ordinary skill in the art and is not to be limited to a special or customized meaning. Without limitation, the activating may be or may comprise a start or a beginning of at least one event or event series. Specifically, activating the bypass circuit may comprise leading an electric current, specifically at least a portion of $I_D$, through the bypass circuit, i.e. around at least one LED. In other words, before the activating, no electric current may go through the bypass circuit and after the activating, electric current may go through the bypass circuit. After the activating, the electric current going through the bypass circuit may vary, specifically increase, more specifically progressively or gradually increase as will be outlined in further detail below. Thus, the activating may specifically be an initial activation into a non-constant or variable state, specifically a state of increasing electric current going through the bypass circuit.

The term "matching", including grammatical variations thereof, as generally used herein is a broad term and is to be given its ordinary and customary meaning to a person of ordinary skill in the art and is not to be limited to a special or customized meaning. Without limitation, matching may refer to an exact matching, such as an exact matching of two physical quantities, specifically two voltages. Alternatively, matching may refer to an approximate matching. Thus, there may specifically be tolerances for deviations of the physical quantities, specifically the two voltages. In other words, the first physical quantity may be slightly larger than the second quantity. Specifically, $V_{th}$ may be slightly higher than $V_{out,min}$. $V_{th}$ may exceed $V_{out,min}$ by less than 1 V, specifically by less than 0.5 V, more specifically by less than 0.25 V. As a result, it may be possible to ensure that the driver circuit receives a sufficient operation voltage, which is above $V_{out,min}$.

For better understanding, the following non-limiting example may be considered. A battery may be used for voltage supply of an LED chain and a corresponding driver circuit. Over time, the battery voltage may decrease. The LEDs may each cause a specific voltage drop. Thus, with decreasing battery voltage, there may be a point in time, when the driver cannot be supplied with a sufficient voltage anymore which may lead to misfunction or failure. As a preventive measure, $V_{th}$ of the detection circuit may be chosen slightly higher than $V_{out,min}$ of the driver circuit, e.g. by choosing corresponding electronic components, specifically a corresponding transistor. Thus, the detection circuit may activate the bypass circuit in time and e.g. one LED may be bypassed in the electronic circuit. As a result, the overall voltage drop over the LED chain may decrease and the remaining voltage may be sufficient for accurate operation of the driver circuit. Thus, failure of the driver circuit may be prevented without the need for additional battery monitoring circuits. By doing so, variations in the voltage drop over the LEDs, e.g. due to temperature, aging effects or binning, may also automatically be compensated. Moreover, it may even be possible to keep the driver circuit in operation for lower battery voltages.

The detection circuit may be configured for controlling the bypass circuit by using a negative loop feedback. Specifically, the detection circuit may be configured for continuously controlling or regulating the bypass circuit, specifically the electric current going through it, by using the negative loop feedback. The term "negative loop feedback" as generally used herein is a broad term and is to be given its ordinary and customary meaning to a person of ordinary skill in the art and is not to be limited to a special or customized meaning. Without limitation, the negative loop feedback may comprise feeding at least a portion of an output of a device or system back as an input in a such fashion that fluctuations in the output are reduced, specifically by using a loop. The loop may be configured for redirecting at least a portion of the output back as input. Specifically, the output and/or the input may be or may comprise an electric current. Specifically, the device or system may be an electronic circuit or a part thereof. The negative loop feedback may comprise a loop within the electronic circuit, such as a loop starting at a node in the electronic circuit and ending again at the node. The loop may comprise at least one electrical component and/or conductive element. The term "negative loop feedback" may also be referred to as "negative feedback", "balancing feedback", "regulating feedback" or "negative feedback loop".

The electronic circuit may be configured for continuously regulating $V_{out}$ by progressively bypassing the LED. In other words, the electronic circuit may be configured for continuously regulating $V_{out}$ by gradually bypassing the LED. The electronic circuit may be configured for continuously increasing the portion of $I_D$ bypassed around the LED with decreasing $V_{out}$ when $V_{out}$ drops below $V_{th}$. Specifically, the electronic circuit may be configured for detecting when $V_{out}$ drops below $V_{th}$, specifically by using the detection circuit. As noted above, $V_{th}$ matches $V_{out,min}$. Upon detecting when $V_{out}$ drops below $V_{th}$, the bypass circuit may be activated and at least a portion of $I_D$ may be led around at least one LED, such that sufficient voltage may still be supplied to the driver circuit. Afterwards, with further decreasing $V_{out}$, the bypassed portion of $I_D$ may as noted above be continuously increased. This may specifically distinguish the presented electronic circuit from a bypass switch, which can typically only set two discrete states, namely a complete ON state and a complete OFF state, and thus typically cannot provide continuous regulation. Instead, as noted above, the presented electronic circuit may apply a negative loop feedback for continuously controlling the bypass circuit and specifically the electric current going through it. In other words, as a result of the negative loop feedback, the bypass effect may increase for a decreasing $V_{out}$. Thus, $V_{out}$ may overall be kept constant at least within a predetermined voltage range. In other words, at least within a predetermined voltage range, the electronic circuit may be configured for keeping $V_{out}$ constant. The predetermined voltage range may specifically refer to a predetermined voltage range of a supply voltage such as a battery voltage. Specifically, the electronic circuit may be configured for keeping $V_{out}$ constant at least after activating the bypass circuit, i.e. after starting bypassing at least one LED, until the supply voltage is too low for supplying the driver circuit even if the LED is fully bypassed. Thus, as a result of the negative loop feedback, the bypass effect may increase for a decreasing supply voltage.

At least one of the bypass circuit and the detection circuit may be an analog circuit. Thus, the bypass circuit and/or the detection circuit may comprise analog components and specifically analog components only. The bypass circuit and/or the detection circuit may be configured for processing analog signals and specifically analog signals only, more specifically continuous electric currents and/or voltages. In other words, at least one of the bypass circuit and the detection circuit may be a non-digital circuit. Thus, the bypass circuit and/or the detection circuit may be free of digital components. However, other options are feasible as well. At least one of the bypass circuit and the detection circuit may also comprise at least one digital component in principle.

The electronic circuit may comprise at least one capacitor configured for stabilizing the electronic circuit. The capacitor may define a low pass filter in the electronic circuit. Thus, the capacitor may be configured and/or arranged for filtering out high frequency signals, specifically high frequency currents, in the electronic circuit for stabilizing the electronic circuit. The capacitor may have a capacitance from 1 nF to 10 nF.

The detection circuit may comprise at least one transistor. As already indicated, $V_{th}$ may be the threshold voltage of the transistor. The term "transistor" as generally used herein is a broad term and is to be given its ordinary and customary meaning to a person of ordinary skill in the art and is not to be limited to a special or customized meaning, without limitation, to a semiconductor device configured for switching and/or amplifying an electrical signal and/or electric power. The transistor may specifically comprise at least three contacts, also referred to as electrodes or terminals. The transistor may be structured in such way that a voltage and/or a current applied to a first pair of the contacts may control the current through a second pair of the contacts. The transistor may specifically be a FET (short for field effect transistor) comprising a gate contact, a drain contact and a source contact, more specifically a MOSFET (short for metal-oxide-semiconductor field effect transistor). The transistor may be arranged, specifically within the electric circuit, such that $V_{out}$ is applied to the gate contact of the transistor. The transistor may be selected from the group consisting of: an N-type enhancement mode MOSFET; a P-type enhancement mode MOSFET; an N-type depletion mode MOSFET; and a P-type depletion mode MOSFET.

The bypass circuit may comprise at least one transistor, specifically at least one FET comprising a gate contact, a drain contact and a source contact. The transistor may be selected from the group consisting of: an N-type enhancement mode MOSFET; a P-type enhancement mode MOSFET; an N-type depletion mode MOSFET; a P-type depletion mode MOSFET. The electronic circuit may comprise at least one of a pull-up resistor and a pull-down resistor. The pull-up resistor may be a resistor arranged and/or configured for connecting a signal line in the electronic circuit to a higher voltage, e.g. a supply voltage, in case no other component, e.g. a switching transistor, actively brings the signal line to a lower voltage, e.g. ground. The pull-down resistor may be a resistor arranged and/or configured for connecting a signal line in the electronic circuit to a lower voltage, e.g. ground, in case no other component, e.g. a switching transistor, actively brings the signal line to a higher voltage, e.g. a supply voltage. The pull-up resistor and/or the pull-down resistor may typically be a high ohmic resistor, e.g. a 100 kΩ resistor. Thus, overall, the presented electronic circuit may in principle work with highly available components in the market, e.g. N-type enhancement mode MOSFETs, capacitors and resistors.

In a further aspect of the present disclosure a driver system is presented. The driver system comprises at least one electronic circuit according to any one of the embodiments described above or below in further detail referring to an electronic circuit. The driver circuit further comprises at least one driver circuit configured for providing a driver current $I_D$. In the driver system, the electronic circuit and the driver circuit may be electronically connected, such as via wires and/or traces. At least one of the bypass circuit and the detection circuit may be an external circuit with respect to the driver circuit. As noted above, the electronic circuit may comprise at least one integrated circuit. The detection circuit may be an integrated circuit. The bypass circuit may be an integrated circuit. The detection circuit and the bypass circuit may also together be part of one integrated circuit. Further, the driver circuit may be a separate integrated circuit. Thus, the bypass circuit and/or the detection circuit may be decoupled from the driver circuit. This may specifically facilitate modular combination and individual dimensioning of components. However, the driver circuit, bypass circuit and detection circuit may also be part of one integrated circuit. The driver system may further comprise at least one sensing resistor configured for sensing at least $I_D$.

In a further aspect of the present disclosure a lighting system is presented. The lighting system comprises at least one driver system according to any one of the embodiments described above or below in further detail referring to a driver system. The lighting system further comprises at least one LED. In the lighting system, the driver system and the LED may be electronically connected, such as via wires and/or traces. The lighting system may comprise at least one voltage source, specifically at least one battery. In the lighting system, the driver system and the LED and the voltage source may be electronically connected, such as via wires and/or traces.

In a further aspect of the present disclosure a method for bypassing at least one LED is presented. The method is performed by using at least one electronic circuit according to any one of the embodiments referring to an electronic circuit disclosed above or below in further detail. The method comprises at least the following steps:

a) activating the bypass circuit by using the detection circuit when an output voltage $V_{out}$ of a driver circuit drops below $V_{th}$ of the detection circuit; and
b) bypassing at least a portion of $I_D$ around the LED by using the bypass circuit.

Specifically, step a) may be performed before step b). More specifically, step a) may trigger step b). Further steps may be feasible. The detection circuit may control the bypass circuit by using a negative loop feedback. The electronic circuit may continuously regulate $V_{out}$ by progressively or gradually bypassing the LED. The electronic circuit may continuously increase the portion of $I_D$ bypassed around the LED with decreasing $V_{out}$ when $V_{out}$ drops below $V_{th}$. At least within a predetermined voltage range, the electronic circuit may keep $V_{out}$ constant. For further definitions and embodiments regarding the method, reference may be made to the definitions and embodiments regarding the electronic circuit outlined above.

The devices and methods presented herein have considerable advantages over the prior art as indicated throughout the description. By using the devices and methods presented herein, it may specifically be possible to prevent failure in driver systems for LEDs such as in automotive applications supplied by battery voltages. Thus, security may be increased, which may be of particular significance for road traffic. Moreover, it may be possible to keep the driver systems in operation for even lower battery voltages. There may be no need for battery monitoring circuits. The presented electronic circuit may not be sensitive to the LED's forward voltage variation, e.g. due to temperature. There may be no need for additional pins in the driver system. It may even work with driver systems featuring a power off-load circuit. The presented electronic circuit may generally be applicable for multiple current sources and current sinks as driver circuits. There may further be a high availability of components for the electric circuit in the market, e.g. N-type enhancement mode MOSFETs. The presented electronic circuit or parts thereof may be an external circuit, which may facilitate easy dimensioning of external components.

Summarizing and without excluding further possible embodiments, the following embodiments may be envisaged:

Embodiment 1: Electronic circuit configured for being connected to at least one LED (light emitting diode) and at least one driver circuit configured for providing a driver current $I_D$, the electronic circuit comprising:

a bypass circuit configured for bypassing at least a portion of $I_D$ around the LED; and a detection circuit defining a threshold voltage $V_{th}$, wherein the detection circuit is configured for activating the bypass circuit when an output voltage $V_{out}$ at the driver circuit drops below $V_{th}$, wherein $V_{th}$ matches a minimum output voltage $V_{out,min}$ of the driver circuit.

Embodiment 2: Electronic circuit according to the preceding embodiment, wherein the detection circuit is configured for controlling the bypass circuit by using a negative loop feedback.

Embodiment 3: Electronic circuit according to any one of the preceding embodiments, wherein the electronic circuit is configured for continuously regulating $V_{out}$ by progressively bypassing the LED.

Embodiment 4: Electronic circuit according to any one of the preceding embodiments, wherein the electronic circuit is configured for continuously increasing the portion of $I_D$ bypassed around the LED with decreasing $V_{out}$ when $V_{out}$ drops below $V_{th}$.

Embodiment 5: Electronic circuit according to any one of the preceding embodiments, wherein, at least within a predetermined voltage range, the electronic circuit is configured for keeping $V_{out}$ constant.

Embodiment 6: Electronic circuit according to any one of the preceding embodiments, wherein at least one of the bypass circuit and the detection circuit is an analog circuit.

Embodiment 7: Electronic circuit according to any one of the preceding embodiments, further comprising at least one capacitor configured for stabilizing the electronic circuit.

Embodiment 8: Electronic circuit according to the preceding embodiment, wherein the capacitor defines a low pass filter in the electronic circuit.

Embodiment 9: Electronic circuit according to any one of the preceding embodiments, wherein $V_{th}$ exceeds $V_{out,min}$ by less than 1 V, specifically by less than 0.5 V, and more specifically by less than 0.25 V.

Embodiment 10: Electronic circuit according to any one of the preceding embodiments, wherein the detection circuit comprises at least one transistor.

Embodiment 11: Electronic circuit according to the preceding embodiment, wherein $V_{th}$ is the threshold voltage of the transistor.

Embodiment 12: Electronic circuit according to any one of the two preceding embodiments, wherein the transistor is a FET (field effect transistor) comprising a gate contact, a drain contact and a source contact, wherein the transistor is arranged such that $V_{out}$ is applied to the gate contact of the transistor.

Embodiment 13: Electronic circuit according to any one of the three preceding embodiments, wherein the transistor is selected from the group consisting of: an N-type enhancement mode MOSFET (metal-oxide-semiconductor field effect transistor); a P-type enhancement mode MOSFET; an N-type depletion mode MOSFET; and a P-type depletion mode MOSFET.

Embodiment 14: Electronic circuit according to any one of the preceding embodiments, wherein the bypass circuit comprises at least one transistor, specifically at least one FET comprising a gate contact, a drain contact and a source contact.

Embodiment 15: Electronic circuit according to the preceding embodiment, wherein the transistor is selected from the group consisting of: an N-type enhancement mode MOSFET; a P-type enhancement mode MOSFET; an N-type depletion mode MOSFET; and a P-type depletion mode MOSFET.

Embodiment 16: Electronic circuit according to any one of the preceding embodiments, further comprising at least one of a pull-up resistor and a pull-down resistor.

Embodiment 17: Driver system comprising at least one electronic circuit according to any one of the preceding embodiments and at least one driver circuit configured for providing a driver current $I_D$.

Embodiment 18: Driver system according to the preceding embodiment, wherein at least one of the bypass circuit and the detection circuit is an external circuit with respect to the driver circuit.

Embodiment 19: Driver system according to any one of the preceding embodiments referring to a driver system, wherein the driver circuit comprises at least one of a current sink, specifically a constant current sink, and a current source, specifically a constant current source.

Embodiment 20: Electronic circuit according to any one of the preceding embodiments referring to a driver system, further comprising at least one sensing resistor configured for sensing at least $I_D$.

Embodiment 21: Lighting system comprising at least one driver system according to any one of the preceding embodiments referring to a driver system and at least one LED.

Embodiment 22: Lighting system according to the preceding embodiment, further comprising at least one voltage source, specifically at least one battery.

Embodiment 23: Method for bypassing at least one LED by using at least one electronic circuit according to any one of the preceding embodiments referring to an electronic circuit, the method comprising at least the following steps:

a) activating the bypass circuit by using the detection circuit when an output voltage $V_{out}$ at a driver circuit drops below $V_{th}$ of the detection circuit; and b) bypassing at least a portion of $I_D$ around the LED by using the bypass circuit.

Embodiment 24: Method according to the preceding embodiment, wherein the detection circuit controls the bypass circuit by using a negative loop feedback.

Embodiment 25: Method according to any one of the preceding embodiments, wherein the electronic circuit continuously regulates $V_{out}$ by progressively bypassing the LED.

Embodiment 26: Method according to any one of the preceding embodiments, wherein the electronic circuit continuously increases the portion of $I_D$ bypassed around the LED with decreasing $V_{out}$ when $V_{out}$ drops below $V_{th}$.

Embodiment 27: Method according to any one of the preceding embodiments, wherein, at least within a predetermined voltage range, the electronic circuit keeps $V_{out}$ constant.

Further specific optional features and embodiments will be disclosed in more detail in the subsequent description of embodiments in conjunction with the figures. Therein, the respective optional features may be realized in an isolated fashion as well as in any arbitrary feasible combination, as the skilled person will realize. The scope of the disclosure is generally not restricted by the preferred embodiments. The embodiments may only be schematically depicted in the figures.

FIG. 1 illustrates a circuit diagram of an exemplary lighting system 110. The lighting system 110 comprises at least one driver system 112 according to any one of the embodiments described above or below in further detail referring to a driver system. The lighting system 110 further comprises at least one LED 114. As shown in FIG. 1, the lighting system 110 may for instance comprise three LEDs 114. The lighting system 110 may further comprise at least one voltage source 116, specifically at least one battery 118. The voltage source 116 may be configured for providing a supply voltage $V_S$. The driver system 112 comprises at least one electronic circuit 120 according to any one of the embodiments described above or below in further detail referring to an electronic circuit. The driver system 112 further comprises at least one driver circuit 122 configured for providing a driver current $I_D$.

The electronic circuit 120 is configured for being connected to the at least one LED 114 and the at least one driver circuit 122 configured for providing a driver current $I_D$. As shown, the electronic circuit 120 may be connected to the at least one LED 114 and/or the at least one driver circuit 122 by using wires and/or traces. Further, the electronic circuit 120 may be configured for being connected to the voltage source 116. Specifically, the electronic circuit 120 may be connected to the voltage source 116 by using wires and/or traces. Generally, the electronic circuit 120 may be connected to further devices by using wires and/or traces. Further, components of the electronic circuit 120 may at least partially be interconnected with each other by using wires and/or traces.

The electronic circuit 120 comprises a bypass circuit 124. The bypass circuit 124 is configured for bypassing at least a portion of $I_D$ around the LED 114. As shown, the bypass circuit 124 may bypass one LED 114. However, in principle two or more LEDs 114 may also be bypassed by the bypass circuit 124. The electronic circuit 120 further comprises a detection circuit 126. The detection circuit 126 is configured for activating the bypass circuit 124 when an output voltage $V_{out}$ of the driver circuit drops 122 below $V_{th}$. $V_{th}$ matches a minimum output voltage $V_{out,min}$ of the driver circuit 122.

At least one of the bypass circuit 124 and the detection circuit 126 may be an analog circuit. As shown, both may for instance be analog. The detection circuit 124 may comprise at least one transistor 128. $V_{th}$ may specifically be the threshold voltage of the transistor 128, unless referred to another component in this description. The transistor 128 may specifically be a FET 130 comprising a gate contact, a drain contact and a source contact. The transistor 128 may be arranged such that $V_{out}$ is applied to the gate contact of the transistor 128. The lighting system 110 may comprise an output node 132 at an output of the driver system 112. Thus, $V_{out}$ may be applied to the output node 132. The detection circuit 126, specifically the gate contact of the transistor 128, may also be connected to the output node 132. Thus, $V_{out}$ may also be applied to the gate contact of the transistor 128. Specifically, the transistor 128 may be an N-type enhancement mode MOSFET 134. The bypass circuit 124 may also comprise at least one transistor 136, specifically at least one FET 138 comprising a gate contact, a drain contact and a source contact. More specifically, the transistor 134 may be an N-type enhancement mode MOSFET 140.

The electronic circuit 120 may further comprise at least one pull-up resistor 142. The pull-up resistor 142 may provide a connection to the voltage source 116, specifically a high ohmic connection. The electronic circuit 120 may further comprise at least one capacitor 144 configured for stabilizing the electronic circuit 120. The capacitor 144 may define a low pass filter in the electronic circuit 120. Thus, the capacitor 144 may be arranged in parallel with the transistor 124.

The driver circuit 122 may be a low-side driver circuit. Thus, the driver circuit 122 may be a current sink 146, specifically a constant current sink 148. Thus, $I_D$ may specifically be a constant current going through the LEDs 114. Generally, many options for realizing a constant current sink are known to the skilled person. As an example, as shown in FIG. 1, the constant current sink 148 may comprise an internal voltage source 150 configured for providing a reference voltage $V_{ref}$ connected to ground 152, an operational amplifier 154 and a transistor 156. The transistor 156 may specifically be a FET 158 and more specifically an N-type enhancement mode MOSFET 160. A plurality of other options are generally also conceivable for realizing the driver circuit 122.

At least one of the bypass circuit 124 and the detection circuit 126 may be an external circuit with respect to the driver circuit 122. Thus, at least one of bypass circuit 124 and the detection circuit 126 may be arranged on a separate substrate such as a separate piece of a semiconductor material, specifically silicon. As an example, the driver circuit 122 may be a first integrated circuit and the bypass circuit 124 and the detection circuit 126 may together form a separate second integrated circuit. As a result, the bypass circuit 124 and the detection circuit 126 may be decoupled from the driver circuit 122. This may specifically facilitate modular combination and individual dimensioning of components. Further, the driver system 112 may comprise at least one sensing resistor 162 configured for sensing at least $I_D$. The sensing resistor 162 may specifically be arranged as a shunt resistor. The sensing resistor 162 may be connected to ground 164.

As indicated, the voltage source 116, specifically the battery 118, may provide the supply voltage $V_S$ to the lighting system 110 and thus to the LEDs 114 and also to the driver circuit 122. The LEDs 114 may cause a predetermined voltage drop of $V_S$. As a result, $V_{out}$ may be present at the output node 132. Thus, $V_{out}$ may be applied to the driver circuit 122. As noted above, in case $V_{out}$ is already too low, e.g. due a decreasing supply voltage $V_S$ provided by a battery, this may lead to a failure of the driver circuit 122. Further, $V_{out}$ may also be applied to the detection circuit 126, specifically to the transistor 128, more specifically to the gate contact of the N-type enhancement mode MOSFET 134. $V_{th}$ of the N-type enhancement mode MOSFET 134 may specifically be slightly higher than the minimum output voltage $V_{out,min}$ of the driver circuit 122, i.e. the minimum output voltage required for faultless operation of the driver circuit 122. Specifically, $V_{th}$ may exceed $V_{out,min}$ by less than 1 V, specifically by less than 0.5 V, and more specifically by less than 0.25 V.

When $V_{out}$ is higher than $V_{out,min}$, and thus also higher than $V_{th}$ of the N-type enhancement mode MOSFET 134, the N-type enhancement mode MOSFET 134 may be in an ON state. Thus, electric current may go from the source contact of the N-type enhancement mode MOSFET 134 to the drain contact of the N-type enhancement mode MOSFET 134. The source contact of the N-type enhancement mode MOSFET 134 may be connected to ground 166. The drain contact of the N-type enhancement mode MOSFET 134 may be connected to $V_S$ via the pull-up resistor 142. Specifically, this may keep the gate voltage of the N-type enhancement mode MOSFET 140 beneath $V_{th}$ of the N-type enhancement mode MOSFET 140. Thus, the N-type enhancement mode MOSFET 140 may be in an OFF state when $V_{out}$ is higher than $V_{out,min}$. Thus, there may be no bypassing of the LED 114 via the bypass circuit 124 when $V_{out}$ is higher than $V_{out,min}$. It shall be noted that said ON state and OFF state may be variable states and not necessarily discrete states. Specifically, the ON state may cover a continuous range of electric current going through a transistor.

When $V_{out}$ comes closer to $V_{out,min}$ and reaches $V_{th}$, the N-type enhancement mode MOSFET 134 may gradually turn off. In other words, the electric current going between the source contact and the drain contact of the N-type enhancement mode MOSFET 134 may gradually decrease. This may pull the gate voltage of the N-type enhancement mode MOSFET 140 towards a higher voltage by using the pull-up resistor 142. In other words, this may in consequence raise the gate voltage of the N-type enhancement mode MOSFET 140, specifically over $V_{th}$ of the N-type enhancement mode MOSFET 140. Thus, the N-type enhancement mode MOSFET 140 may gradually turn on and open the bypass circuit 124. As a result, continuously more electric current may go from the source contact to the drain of the N-type enhancement mode MOSFET 140. The source contact and the drain contact of the N-type enhancement mode MOSFET 140 may be connected to a cathode and an anode of the bypassed LED 114, respectively. Thus, continuously less electric current, specifically a continuously smaller portion of $I_D$, may go through the bypassed LED 114. As a result, the overall voltage drop over all LEDs 114 may decrease and $V_{out}$ may still be sufficient for faultless operation of the driver circuit 122.

Thus, overall, the detection circuit 126 may be configured for controlling the bypass circuit 124 by using a negative loop feedback. As outlined above, with decreasing $V_{out}$, the gate voltage of the N-type enhancement mode MOSFET 134 may decrease, and the gate voltage of the N-type enhancement mode MOSFET 140 may increase, such that an increasing portion of $I_D$ is bypassed around the LED 114. This may consequently decrease the voltage drop over the LED 114 and thus increase $V_{out}$ again. Thus, the electronic circuit 120 may be configured for controlling the bypass effect by using a negative loop feedback. Essentially, the electronic circuit 120 may be configured for controlling $V_{out}$ by using a negative loop feedback. The electronic circuit 120 may be configured for continuously regulating $V_{out}$ by progressively bypassing the LED 114. The electronic circuit 120 may be configured for continuously increasing the portion of $I_D$ bypassed around the LED 114 with decreasing $V_{out}$ when $V_{out}$ drops below $V_{th}$. Thus, at least within a predetermined voltage range, the electronic circuit 120 may be configured for keeping $V_{out}$ constant as will also be outlined in further detail below.

Figure 2:
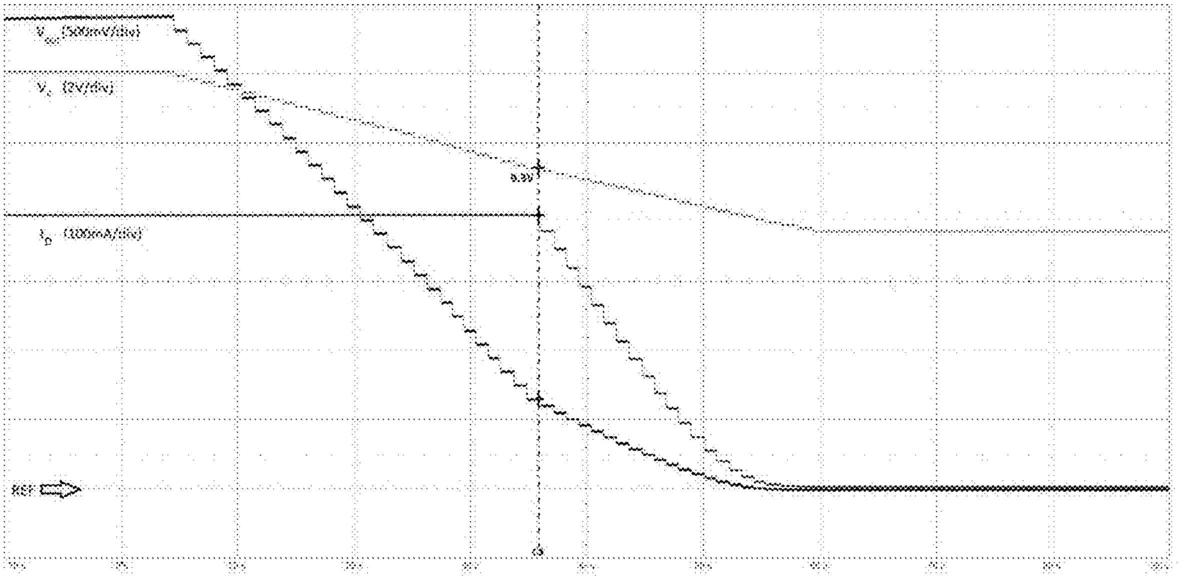
FIGS. 2 and 3 illustrate experimental results of measurements on the lighting system.
Figure 3:
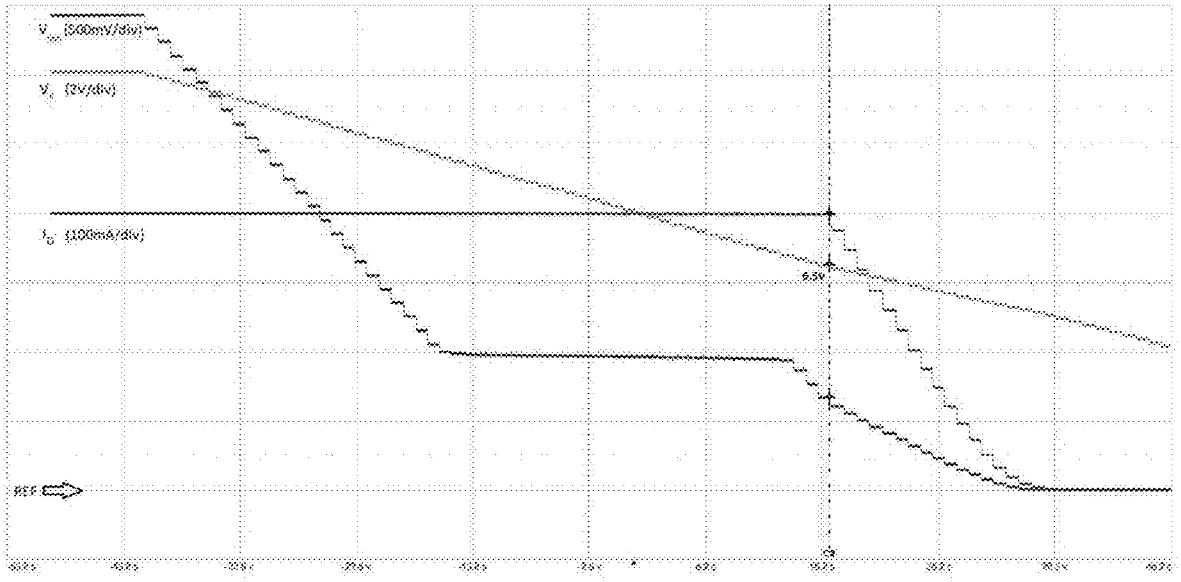

FIGS. 2 and 3 illustrate experimental results of measurements on the exemplary lighting system 110 shown in FIG. 1. Specifically, FIG. 2 illustrates experimental results obtained without using the presented electronic circuit 120 and FIG. 3 illustrates experimental results obtained by using the presented electronic circuit 120. FIGS. 2 and 3 show the progress of $V_{out}$, $V_S$ and $I_D$ over time. $V_{out}$, $V_S$ and $I_D$ are shown in mV/div, V/div and mA/div, respectively, with regard to the vertical scale value. The time is shown in seconds. Without the presented electronic circuit 120, as shown in FIG. 2, $V_{out}$ continuously decreases with decreasing $V_S$. When $V_S$ reaches 9.3 V, $I_D$ starts decreasing since $V_{out}$ is not sufficient for normal operation of the driver circuit 122 anymore. With the presented electronic circuit 120, as shown in FIG. 3, $V_{out}$ stays constant for a wider voltage range of $V_S$ due to regulation via progressively bypassing the LED 114. Further, $V_S$ can go down to 6.5 V until $I_D$ starts decreasing. Thus, the driver circuit 122 can be kept in normal operation significantly longer.

FIGS. 4 to 7 illustrate circuit diagrams of further exemplary lighting systems. Specifically, FIGS. 4 to 7 illustrate variations of the electronic circuit 120 and the driver circuit 122 as shown in FIG. 1. More specifically, FIGS. 4 to 7 illustrate variations using different kinds of MOSFETs in combination with high-side or low-side driver circuits. Thus, at least to a large extent, reference may also be made to the description of FIG. 1 for further details.

Figure 4:
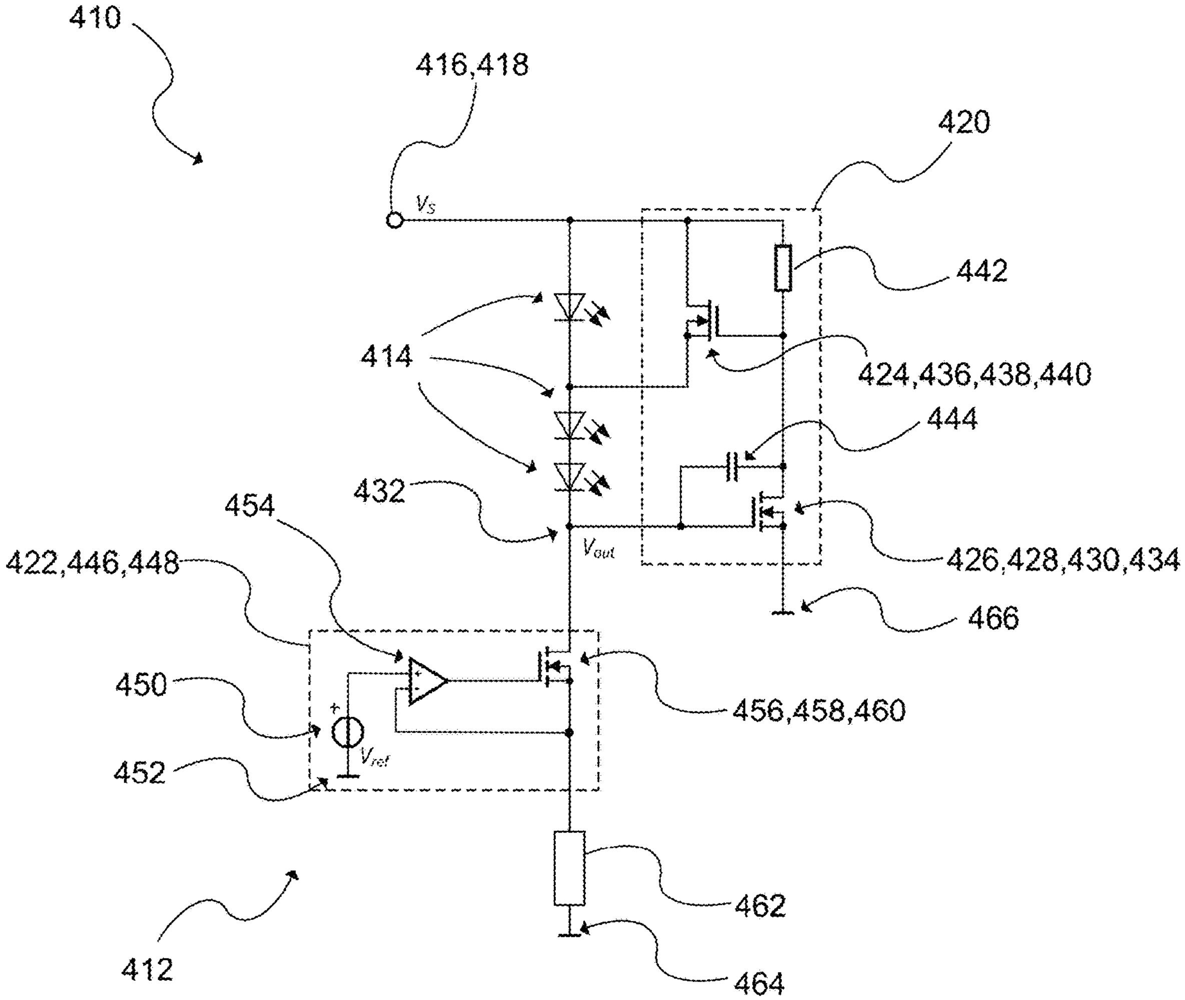
FIGS. 4 to 7 illustrate circuit diagrams of further exemplary lighting systems.

FIG. 4 illustrates an exemplary lighting system 410, which may, at least to a large extent, be similar to lighting system 110. Thus, the respective system components may, at least to a large extent, correspond to each other and reference may be made to the description above for further details. Specifically, a driver system 412 may correspond to the driver system 112. LEDs 414 may correspond to the LEDs 114. A voltage source 416 may correspond to the voltage source 116. A battery 418 may correspond to the battery 118. A sensing resistor 462 may correspond to the sensing resistor 162. Grounds 464 and 466 may correspond to the grounds 164 and 166, respectively. A driver circuit 422 may correspond to the driver circuit 122. Specifically, a current sink 446, a constant current sink 448, a voltage source 450, a ground 452, an operational amplifier 454, a transistor 456, which may specifically be a FET 458 and more specifically an N-type enhancement mode MOSFET 460, may correspond to the respective components of the driver circuit 122. An electronic circuit 420 may, at least to a large extent, correspond to the electronic circuit 120. Specifically, an output node 432 may correspond to the output node 132, a pull-up resistor 442 may correspond to the pull-up resistor 142 and a capacitor 444 may correspond to the capacitor 144.

A bypass circuit 424 may, at least to a large extent, correspond to the bypass circuit 124. A detection circuit 426 may, at least to a large extent, correspond to the detection circuit 126. The bypass circuit 424 may comprise a transistor 436, specifically a FET 438, and more specifically an N-type depletion mode MOSFET 440. In other words, transistor 436 may be an N-type depletion mode MOSFET 440. Generally, N-type depletion mode MOSFET may be in an ON state when its $V_{th}$ is applied to its gate contacts. The detection circuit 426 may comprise a transistor 428, specifically a FET 430, and more specifically an N-type enhancement mode MOSFET 434. Thus, as before, when $V_{out}$ reaches $V_{th}$ of the N-type enhancement mode MOSFET 434, the N-type enhancement mode MOSFET 434 may gradually turn off, which may raise the gate voltage of the N-type depletion mode MOSFET 440, specifically above $V_{th}$ of N-type depletion mode MOSFET 440. As a result, the N-type depletion mode MOSFET 440 in the bypass circuit 424 may gradually turn on.

Figure 5:
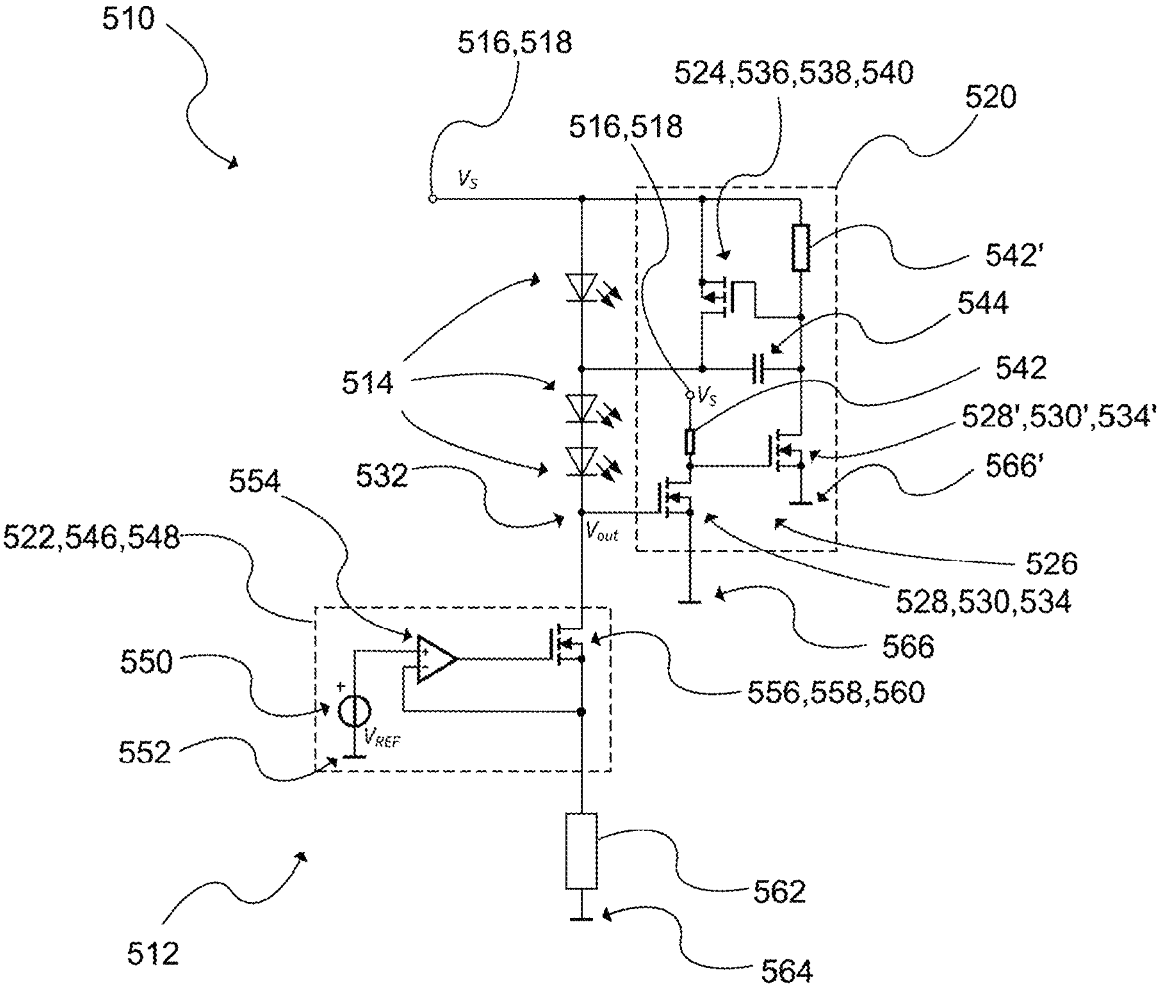

FIG. 5 illustrates an exemplary lighting system 510, which may again, at least to a large extent, be similar to lighting system 110. Thus, the respective system components may, at least to a large extent, correspond to each other and reference may be made to the description above for further details. Specifically, a driver system 512 may correspond to the driver system 112. LEDs 514 may correspond to the LEDs 114. A voltage source 516 may correspond to the voltage source 116. A battery 518 may correspond to the battery 118. A sensing resistor 562 may correspond to the sensing resistor 162. Ground 564 may correspond to the ground 164. A driver circuit 522 may correspond to the driver circuit 122. Specifically, a current sink 546, a constant current sink 548, a voltage source 550, a ground 552, an operational amplifier 554, a transistor 556, which may specifically be a FET 558 and more specifically an N-type enhancement mode MOSFET 560, may correspond to the respective components of the driver circuit 122. An electronic circuit 520 may, at least to a large extent, correspond to the electronic circuit 120. Specifically, an output node 532 may correspond to the output node 532 and a capacitor 544 may correspond to the capacitor 144.

A bypass circuit 524 may, at least to a large extent, correspond to the bypass circuit 124. A detection circuit 526 may, at least to a large extent, correspond to the detection circuit 126. The bypass circuit 524 may comprise a transistor 436, specifically a FET 438, more specifically a P-type enhancement mode MOSFET 540. In other words, transistor 436 may be a P-type enhancement mode MOSFET 540. The detection circuit 526 may comprise a first transistor 528, specifically a FET 530, and more specifically an N-type enhancement mode MOSFET 534, and a second transistor 528', specifically a FET 530', and more specifically an N-type enhancement mode MOSFET 534'. The source contact of N-type enhancement mode MOSFET 534 may be connected to ground 566. The source contact of N-type enhancement mode MOSFET 534' may be connected to ground 566'. The electronic circuit 520, may comprise a first pull-up resistor 542 connected to the drain contact of the N-type enhancement mode MOSFET 534 and a second pull-up resistor 542' connected to the drain contact of the N-type enhancement mode MOSFET 534'. The drain contact of the N-type enhancement mode MOSFET 534 may further be connected to the gate contact of the N-type enhancement mode MOSFET 534'. $V_{th}$ of the N-type enhancement mode MOSFET 534 may be slightly higher than $V_{out,min}$. Thus, when $V_{out}$ reaches $V_{out,min}$, the N-type enhancement mode MOSFET 534 may gradually turn off and gradually less electric current may dissipate towards ground 566. By using the pull-up resistor 542, the voltage applied to the gate contact of the N-type enhancement mode MOSFET 534' may increase, which may gradually turn on the N-type enhancement mode MOSFET 534'. Thus, electric current may dissipate towards ground 566'. This may again decrease the gate voltage applied to the P-type enhancement mode MOSFET 540 of the bypass circuit 524. As a result, the P-type enhancement mode MOSFET 540 may gradually turn on for bypassing the upper LED 514.

Figure 6:
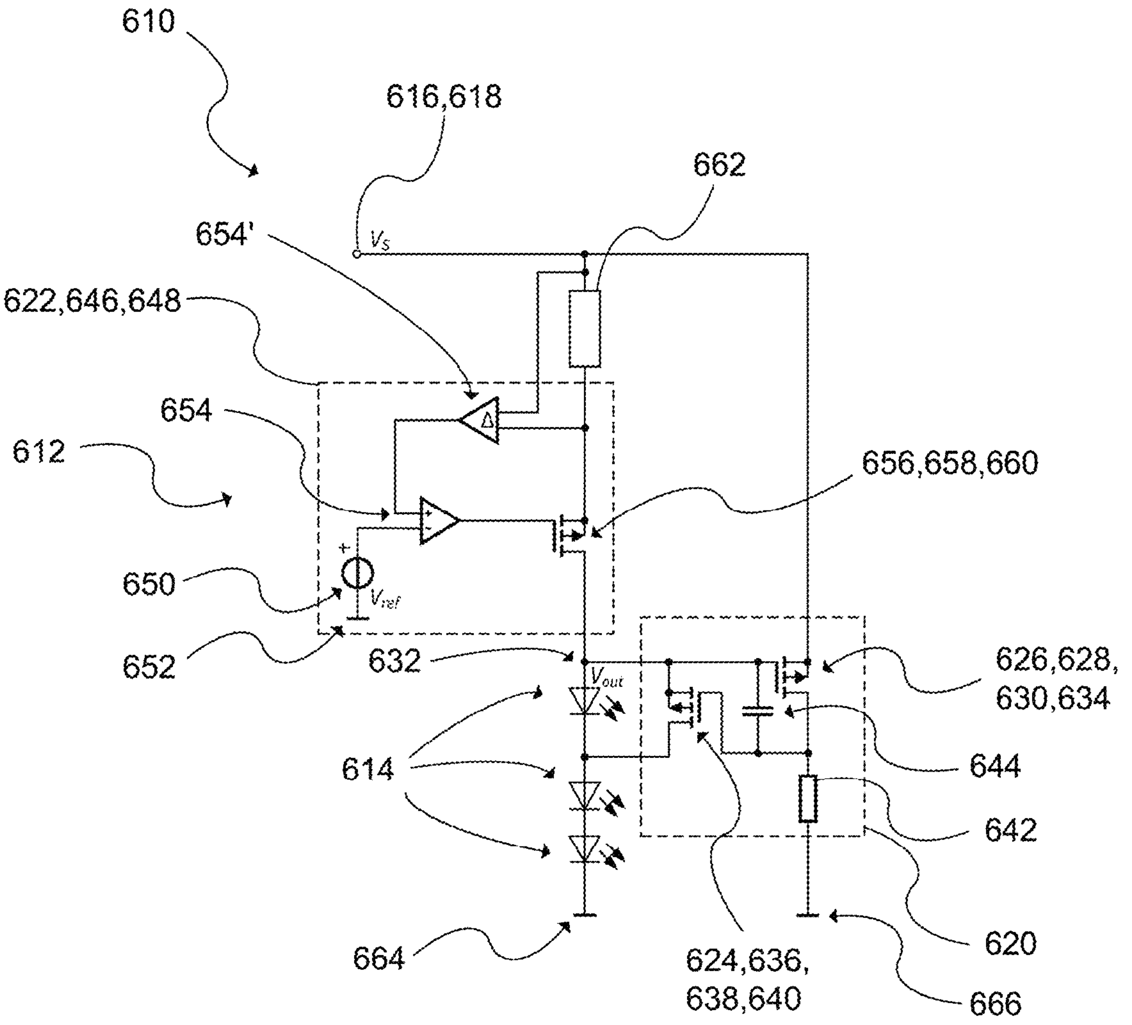

FIG. 6 illustrates an exemplary lighting system 610, which may again, at least to a large extent, be similar to lighting system 110. Thus, the respective system components may, at least to a large extent, correspond to each other and reference may be made to the description above for further details. Specifically, LEDs 614 may correspond to the LEDs 114. The LEDs may be connected to ground 664. A voltage source 616 may correspond to the voltage source 116. A battery 618 may correspond to the battery 118. A sensing resistor 662 may correspond to the sensing resistor 162. A driver system 512 may, at least to a large extent, correspond to the driver system 112.

Specifically, the driver system 612 may comprise a driver circuit 622 which may be a high-side driver circuit. Thus, the driver circuit 622 may be a current source 646, specifically a constant current source 648. Thus, $I_D$ may specifically be a constant current going through the LEDs 614. Generally, many options for realizing a constant current source are known to the skilled person. As an example, as shown in FIG. 6, the constant current source 648 may comprise an internal voltage source 650 configured for providing a reference voltage $V_{ref}$ connected to ground 652, operational amplifiers 654 and 654' and a transistor 656. The transistor 656 may specifically be a FET 658 and more specifically a P-type enhancement mode MOSFET 660. A plurality of other options are generally also conceivable for realizing the driver circuit 622.

An electronic circuit 620 may, at least to a large extent, correspond to the electronic circuit 120. Specifically, an output node 632 may correspond to the output node 132 and a capacitor 644 may correspond to the capacitor 144. A bypass circuit 624 may, at least to a large extent, correspond to the bypass circuit 124. A detection circuit 626 may, at least to a large extent, correspond to the detection circuit 126. The bypass circuit 624 may comprise a transistor 636, specifically a FET 638, and more specifically a P-type enhancement mode MOSFET 640. In other words, transistor 636 may be a P-type enhancement mode MOSFET 640. The detection circuit 626 may comprise a transistor 628, specifically a FET 630, and more specifically a P-type enhancement mode MOSFET 634. In other words, transistor 628 may be a P-type enhancement mode MOSFET 634. Thus, in this exemplary embodiment, the driver system 620 may use P-type enhancement mode MOSFETs only. P-type enhancement mode MOSFETs may generally be in an ON state for a gate-source voltage below their $V_{th}$ and in an OFF state for a gate voltage above their $V_{th}$. However, as noted above, other transistors, specifically other kinds of MOSFETs or mixed kinds of MOSFETs, may also be used generally. The electronic circuit 620 may further specifically comprise a pull-down resistor 642. The pull-down resistor 642 may provide a connection to ground 666, specifically a high ohmic connection. In other words, the pull-down resistor 642 may be connected to ground 666.

Specifically, $V_{th}$ of the P-type enhancement mode MOSFET 634 may be slightly higher than $V_{out,min}$. The source contact of the P-type enhancement mode MOSFET 634 may be connected to $V_S$. Thus, when $V_{out}$ reaches $V_{out,min}$, the P-type enhancement mode MOSFET 634 may gradually turn off. Consequently, a gate voltage of the P-type enhancement mode MOSFET 640 of the bypass circuit 624 may be pulled towards a lower voltage by using the pull-down resistor 642 connected to the ground 666. The source contact of the P-type enhancement mode MOSFET 640 may be connected to $V_{out}$. As a result, the P-type enhancement mode MOSFET 640 may gradually turn on.

Figure 7:
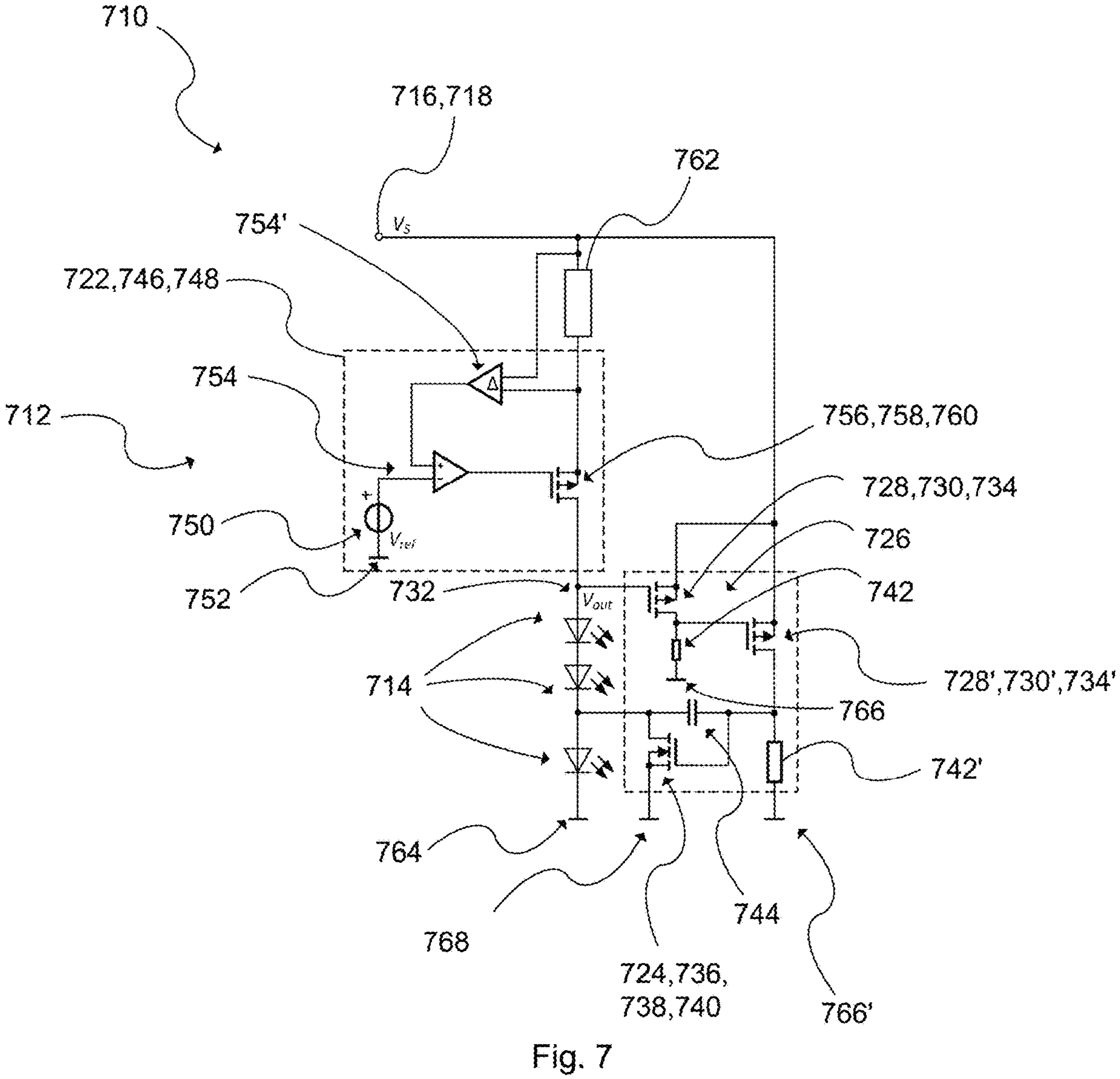

FIG. 7 illustrates an exemplary lighting system 710, which may again, at least to a large extent, be similar to lighting system 110. Thus, the respective system components may, at least to a large extent, correspond to each other and reference may be made to the description above for further details. Specifically, LEDs 714 may correspond to the LEDs 114. The LEDs may be connected to ground 764. A voltage source 716 may correspond to the voltage source 116. A battery 618 may correspond to the battery 118. A sensing resistor 762 may correspond to the sensing resistor 162. A driver system 612 may, at least to a large extent, correspond to the driver system 112.

Again, the driver system 712 may comprise a driver circuit 722 which may be a high-side driver circuit. Thus, the driver circuit 722 may be a current source 746, specifically a constant current source 748. Thus, $I_D$ may specifically be a constant current going through the LEDs 614. As an example, the constant current sink 748 may comprise an internal voltage source 750 configured for providing a reference voltage $V_{ref}$ connected to ground 752, operational amplifiers 754 and 754' and a transistor 756. The transistor 756 may specifically be a FET 758 and more specifically a P-type enhancement mode MOSFET 760. A plurality of other options are generally also conceivable for realizing the driver circuit 622 as already mentioned.

An electronic circuit 720 may, at least to a large extent, correspond to the electronic circuit 120. Specifically, an output node 732 may correspond to the output node 132 and a capacitor 744 may correspond to the capacitor 144. A bypass circuit 724 may, at least to a large extent, correspond to the bypass circuit 124. A detection circuit 726 may, at least to a large extent, correspond to the detection circuit 126. The bypass circuit 724 may comprise a transistor 736, specifically a FET 738, and more specifically an N-type enhancement mode MOSFET 640. In other words, transistor 736 may be an N-type enhancement mode MOSFET 740. The source contact of the N-type enhancement mode MOSFET 740 may be connected to ground 768. The detection circuit 726 may comprise a transistor 728, specifically a FET 730, and more specifically a P-type enhancement mode MOSFET 734. The detection circuit 726 may further comprise a transistor 728', specifically a FET 730', and more specifically a P-type enhancement mode MOSFET 734'. The electronic circuit 720 may further specifically comprise a pull-down resistor 742. The pull-down resistor 742 may be connected to the drain contact of the P-type enhancement mode MOSFET 734 and further to ground 766. The drain contact of the P-type enhancement mode MOSFET 734 may further be connected to the gate contact of the P-type enhancement mode MOSFET 734'. The electronic circuit 720 may further comprise a pull-down resistor 742'. The pull-down resistor 742' may be connected to the drain contact of the P-type enhancement mode MOSFET 734' and further to ground 766'.

$V_{th}$ of the P-type enhancement mode MOSFET 734 may be slightly higher than $V_{out,min}$. The source contact of the P-type enhancement mode MOSFET 734 may be connected to $V_S$. Thus, when $V_{out}$ reaches $V_{out,min}$, the P-type enhancement mode MOSFET 734 may gradually turn off. Consequently, the gate voltage of the P-type enhancement mode MOSFET 734' may be pulled towards a lower voltage by using the pull-down resistor 742 connected to ground 766. The source contact of the P-type enhancement mode MOSFET 734' may also be connected to $V_S$. Thus, the P-type enhancement mode MOSFET 734' of the detection circuit 726 may gradually turn on. Consequently, the gate voltage of the N-type enhancement mode MOSFET 740 may be pulled towards a higher voltage. As a result, the N-type enhancement mode MOSFET 740 of the bypassing circuit 724 may gradually turn on.

Figure 8:
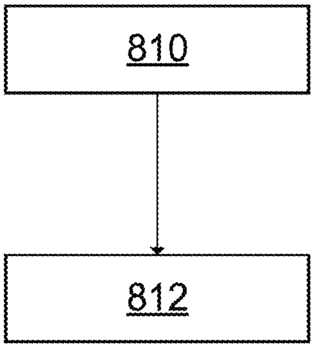
FIG. 8 illustrates a flow chart of an exemplary method for bypassing at least one LED.

FIG. 8 illustrates a flow chart of an exemplary method for bypassing at least one LED by using at least one electronic circuit according to any one of the embodiments described above or below in further detail referring to an electronic circuit. The method comprises at least the following steps:

a) (denoted with reference numeral 810) activating the bypass circuit by using the detection circuit when an output voltage $V_{out}$ of a driver circuit drops below $V_{th}$ of the detection circuit; and b) (denoted with reference numeral 812) bypassing at least a portion of $I_D$ around the LED by using the bypass circuit.

Specifically, step a) may be performed before step b). More specifically, step a) may trigger step b). Further steps may be feasible. The detection circuit may control the bypass circuit by using a negative loop feedback. The electronic circuit may continuously regulate $V_{out}$ by progressively or gradually bypassing the LED. The electronic circuit may continuously increase the portion of $I_D$ bypassed around the LED 114 with decreasing $V_{out}$ when $V_{out}$ drops below $V_{th}$. At least within a predetermined voltage range, the electronic circuit may keep $V_{out}$ constant.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

It should be noted that the methods and devices including the preferred embodiments as outlined in the present document may be used stand-alone or in combination with the other methods and devices disclosed in this document. In addition, the features outlined in the context of a device are also applicable to a corresponding method, and vice versa. Furthermore, all aspects of the methods and devices outlined in the present document may be arbitrarily combined. In particular, the features of the claims may be combined with one another in an arbitrary manner.

It should be noted that the description and drawings merely illustrate the principles of the proposed methods and devices. Those skilled in the art will be able to implement various arrangements that, although not explicitly described or shown herein, embody the principles of the disclosure and are included within its spirit and scope. Furthermore, all examples and embodiments outlined in the present document are principally intended expressly to be only for explanatory purposes to help the reader in understanding the principles of the proposed methods and systems. Furthermore, all statements herein providing principles, aspects, and embodiments of the disclosure, as well as specific examples thereof, are intended to encompass equivalents thereof.

The invention claimed is:

1. An electronic circuit configured for being connected to at least one light emitting diode (LED) and at least one driver circuit configured for providing a regulated driver current, wherein the driver circuit comprises at least one of a constant current sink and a constant current source, the electronic circuit comprising:

a bypass circuit configured for bypassing at least a portion of the regulated driver current around the LED; and a detection circuit defining a threshold voltage, wherein the detection circuit is configured for activating the bypass circuit in response to an output voltage of the driver circuit dropping below the threshold voltage, wherein the threshold voltage matches a minimum output voltage of the driver circuit.

2. The electronic circuit according to claim 1, wherein the detection circuit is configured for controlling the bypass circuit by using a negative loop feedback.

3. The electronic circuit according to claim 1, wherein the electronic circuit is configured for continuously regulating the output voltage by progressively bypassing the LED.

4. The electronic circuit according to claim 1, wherein the electronic circuit is configured for continuously increasing the portion of the driver current bypassed around the LED with the output voltage decreasing in response to the output voltage dropping below the threshold voltage.

5. The electronic circuit according to claim 1, wherein, at least within a predetermined voltage range, the electronic circuit is configured for keeping the output voltage constant.

6. The electronic circuit according to claim 1, wherein at least one of the bypass circuit and the detection circuit comprises an analog circuit.

7. The electronic circuit according to claim 1, further comprising at least one capacitor configured for stabilizing the electronic circuit wherein the capacitor defines a low pass filter in the electronic circuit.

8. The electronic circuit according to claim 1, wherein the detection circuit comprises at least one transistor, wherein the threshold voltage is the threshold voltage of the transistor.

9. The electronic circuit according to claim 8, wherein the transistor is a field effect transistor (FET) comprising a gate contact, a drain contact, and a source contact, wherein the transistor is arranged such that the output voltage is applied to the gate contact of the transistor.

10. The electronic circuit according to claim 1, wherein the threshold voltage exceeds the minimum output voltage by less than 0.5 V.

11. A driver system comprising at least one electronic circuit and at least one driver circuit configured for providing a regulated driver current, wherein the at least one driver circuit comprises at least one of a constant current sink and a constant current source, wherein the electronic circuit is configured for being connected to at least one light emitting diode (LED) and the driver circuit, the electronic circuit comprising:

a bypass circuit configured for bypassing at least a portion of the regulated driver current around the LED; and a detection circuit defining a threshold voltage, wherein the detection circuit is configured for activating the bypass circuit in response to an output voltage of the driver circuit dropping below the threshold voltage, wherein the threshold voltage matches a minimum output voltage of the driver circuit.

12. The driver system according to claim 11, wherein the driver circuit comprises a first integrated circuit, and wherein the bypass circuit and the detection circuit together form a second integrated circuit that is separate from the first integrated circuit.

13. A lighting system comprising at least one driver system and at least one LED, wherein the driver system comprises at least one electronic circuit and at least one driver circuit configured for providing a regulated driver current, wherein the driver circuit comprises at least one of a constant current sink and a constant current source, wherein the electronic circuit is configured for being connected to at least one light emitting diode (LED) and the driver circuit, the electronic circuit comprising:

a bypass circuit configured for bypassing at least a portion of the regulated driver current around the LED; and a detection circuit defining a threshold voltage, wherein the detection circuit is configured for activating the bypass circuit in response to an output voltage of the driver circuit dropping below the threshold voltage, wherein the threshold voltage matches a minimum output voltage of the driver circuit.

14. The lighting system according to claim 13, further comprising a battery configured to provide a supply voltage to the at least one LED and the driver circuit.

15. A method for bypassing at least one LED by using at least one electronic circuit, wherein the electronic circuit is configured for being connected to at least one light emitting diode (LED) and a driver circuit configured for providing a regulated driver current, the driver circuit comprising at least one of a constant current sink and a constant current source, the electronic circuit comprising:

a bypass circuit configured for bypassing at least a portion of the regulated driver current around the LED; and a detection circuit defining a threshold voltage, wherein the detection circuit is configured for activating the bypass circuit in response to an output voltage of the driver circuit dropping below the threshold voltage, wherein the threshold voltage matches a minimum output voltage of the driver circuit, the method comprising at least the following steps:

activating the bypass circuit by using the detection circuit in response to an output voltage of the driver circuit dropping below the threshold voltage of the detection circuit; and bypassing at least a portion of the regulated driver current around the LED by using the bypass circuit.

* * * * *